INVENTOR.
George F. Seagreaves

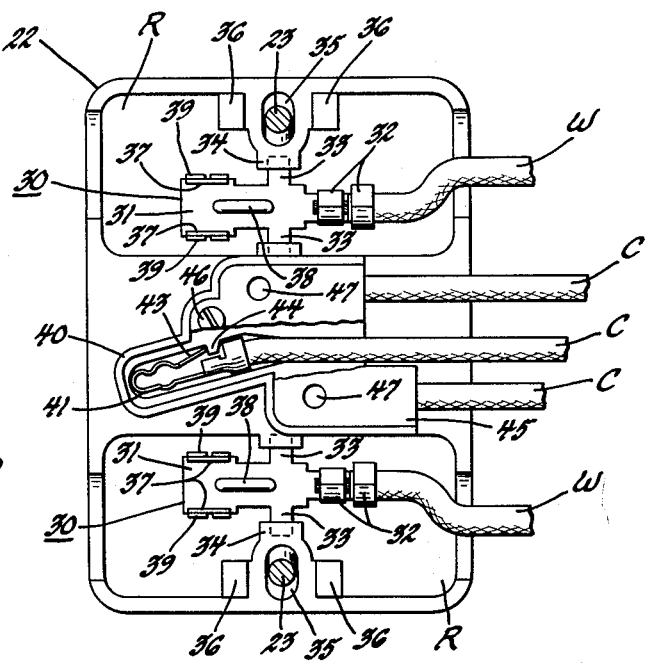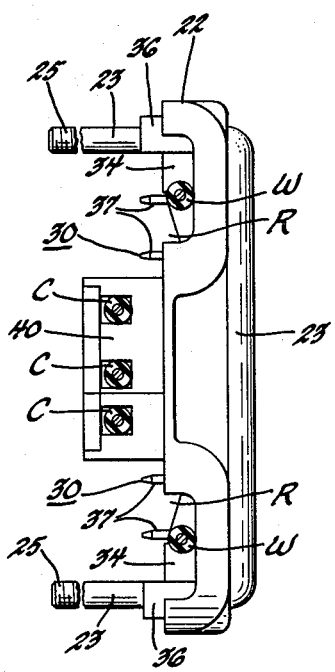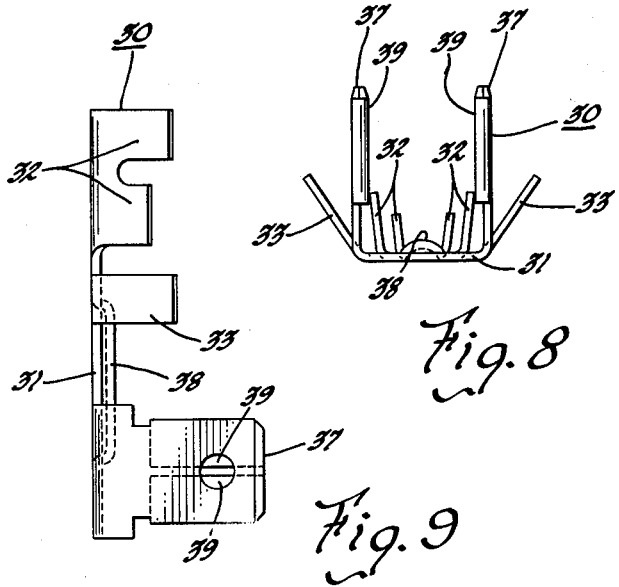

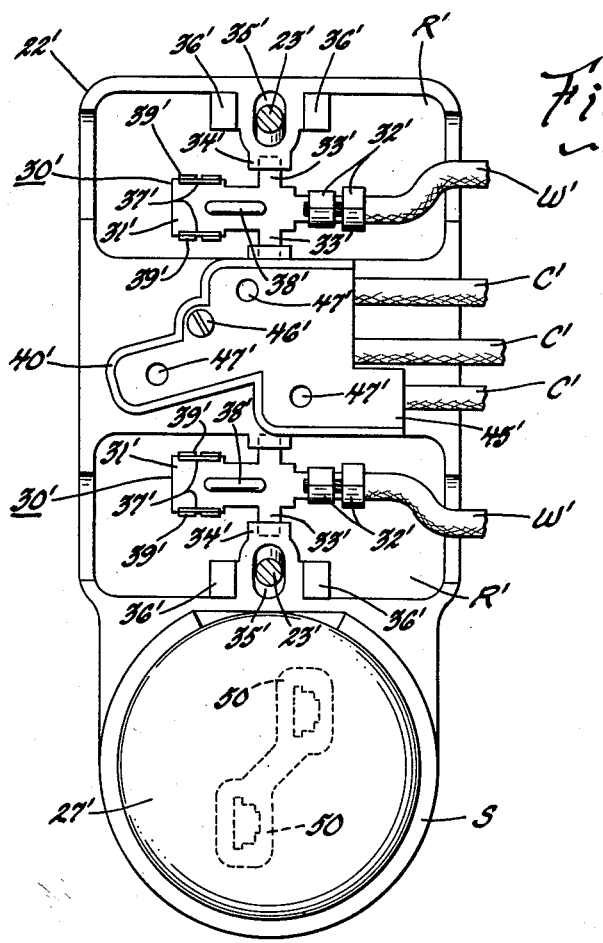
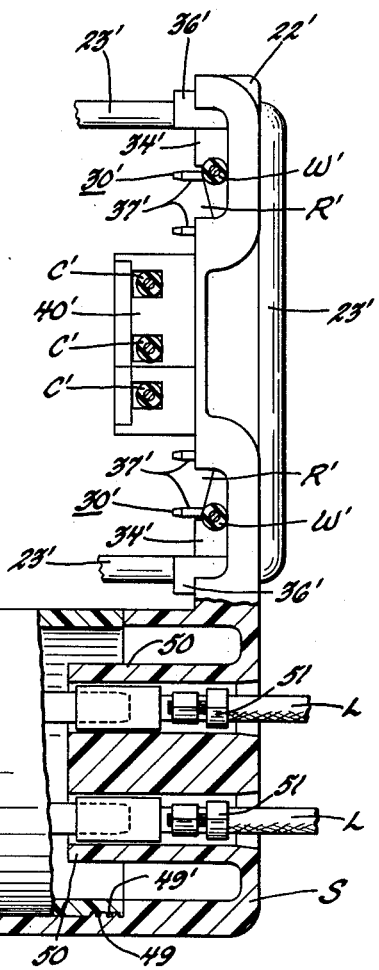
Fig. 4
Fig. 5
INVENTOR.
George F. Seagreaves
BY
HIS ATTORNEY

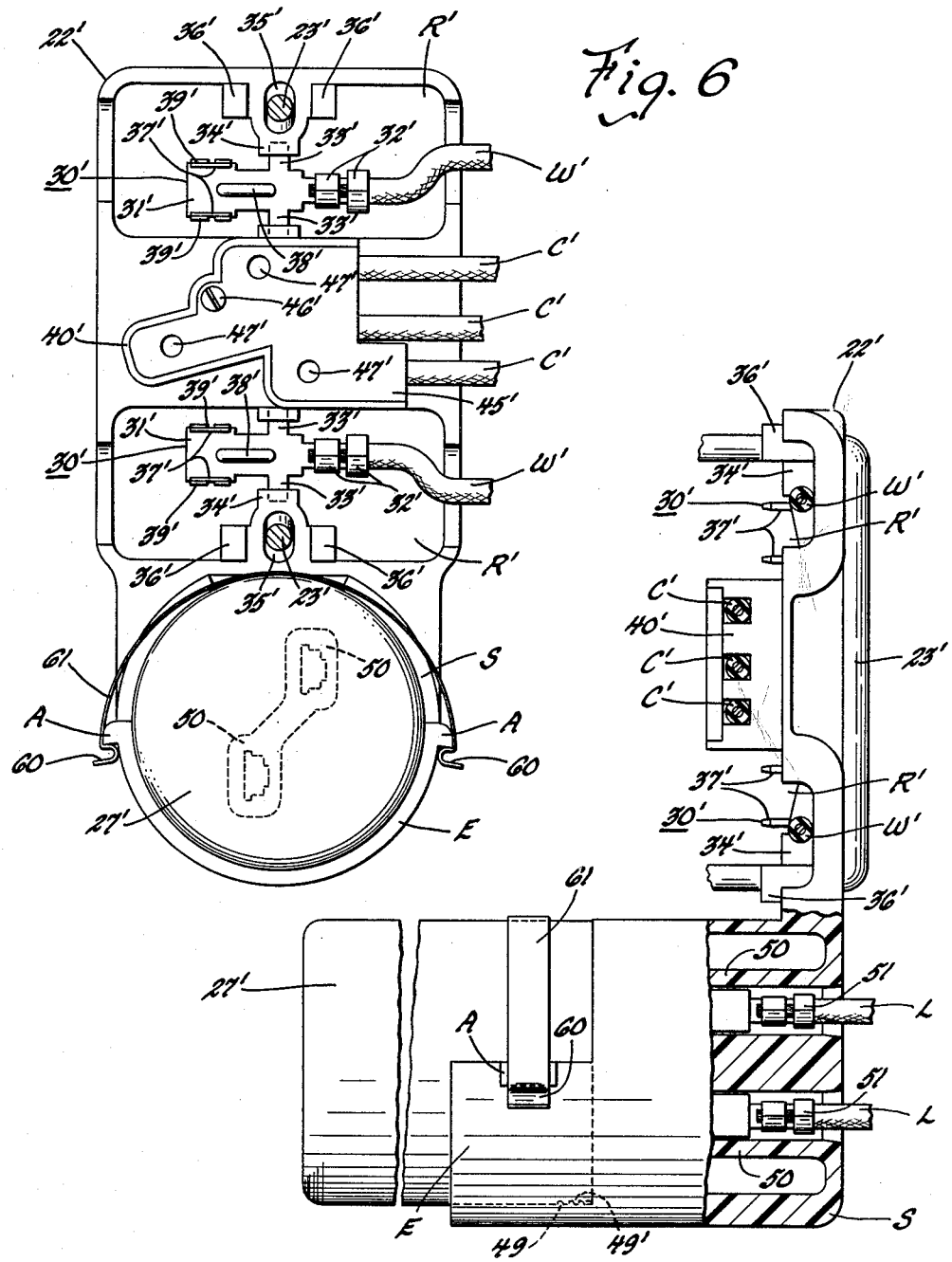

United States Patent Office 3,179,852
Patented Apr. 20, 1965

3,179,852
REFRIGERATION RELAY BOX AND
CONDENSER ASSEMBLY
George F. Seagreaves, Warren, Ohio, assignor to General
Motors Corporation, Detroit, Mich., a corporation of
Delaware
Filed Nov. 24, 1961, Ser. No. 154,461
9 Claims. (Cl. 317—99)

This invention relates to pre-assembled appliance components and, more particularly, to an improved method of assembling and housing a relay box immediately adjacent to a condenser for use in cooling or refrigerating systems and the like.

An object of this invention is to provide a new and improved assembly of relay box means immediately adjacent to a condenser for use in refrigerating equipment where repair work and serviceability are facilitated by provision of a relay box cover portion having cable and terminals pre-assembled thereto.

Another object of this invention is to provide for improved serviceability of refrigerating systems by provision of a relay box means of moldable insulating material having a cover portion with cable and snap-in terminals pre-assembled directly thereto and combined with an integral condenser or capacitor means mounting socket portion located immediately adjacent thereto and removable therewith.

Another object of this invention is to facilitate maintenance of refrigerating systems by use of a pre-assembled relay box cover portion having a harness-like cable and snap-in terminal means joined directly thereto and combined with an integral condenser or capacitor means mounting socket portion located immediately adjacent thereto and removable therewith though provided with a resilient latchable clamp means to embrace and hold the condenser or capacitor means in place in the integral mounting socket portion.

A further object of this invention is to provide for improved serviceability of refrigerating system components by having a relay box cover portion of moldable insulating material recessed to receive cable and snap-in terminals pre-assembled directly thereto by the cable and terminal manufacturer where electrical continuity can be established in advance with reduction in cost of assembly and of material.

Another object of this invention is to provide a dual male blade terminal means for use in a relay box cover portion of moldable insulating material recessed to receive cable and terminal means attached directly to cable ending by a multiple side wing crimp portion integral with a metal body portion of the terminal means that includes a pair of opposite and laterally outwardly projecting tab portions to snap-fit into frictional locking engagement with the recessed cover portion to pre-position substantially parallel male blade portions therewith in a location on a side of the tab portions opposite to that of the crimp portion.

Further objects and advantages of the present invention will be apparent from the following description, reference being had to the accompanying drawings wherein preferred embodiments of the present invention are clearly shown.

In the drawings:

FIGURE 1 provides a side view of a pre-assembled relay box cover portion and condenser means mounting for use in cooling or refrigerating apparatus.

FIGURE 2 is a bottom view of the pre-assembled relay box cover portion of FIGURE 1.

FIGURE 3 is an end view of the cover portion of FIGURE 2.

FIGURE 4 is a bottom view of a relay box cover portion with cable and snap-in terminal means pre-assembled directly thereto and combined with an integral condenser or capacitor means mounting socket portion located immediately adjacent thereto and removable therewith.

FIGURE 5 is a partially sectioned side view of the structure of FIGURE 4.

FIGURE 6 is a bottom view of a modification of the structure of FIGURE 4 and provided with a clamp-like retainer or latching clip means to hold a condenser or capacitor means in place in the integral socket portion of the relay box cover means.

FIGURE 7 is a partially sectioned side view of the structure of FIGURE 6.

FIGURE 8 is an end view of dual male blade terminal means per se used in structures of FIGURES 2 through 7.

FIGURE 9 is a side view of the terminal means of FIGURE 8.

Figure 1:
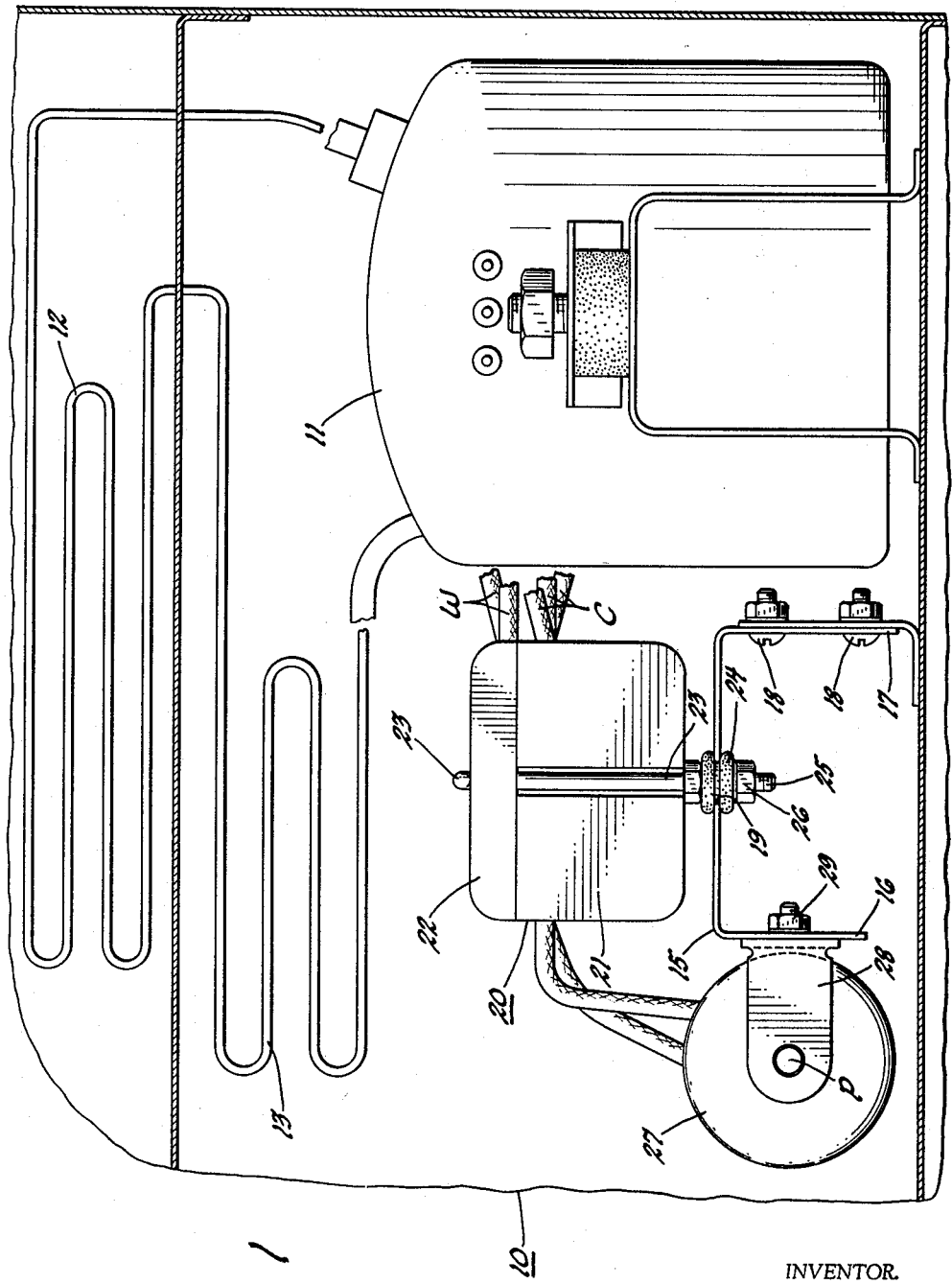

Manufacturers of cooling or refrigerating appliances such as refrigerators, deep freezers as well as air conditioners generally strive to improve serviceability of their products while also improving assembly and housing of components of such appliances. On such cooling or refrigerating apparatus there is generally a relay means provided to establish intermittent operation of a motor-driven compressor for circulation of a cooling medium such as Freon and the like through a typical refrigerating system including an evaporator as well as a condenser. Operation of the motor-driven compressor requires use of stator winding coils having an impedance or inductive reactance through which current flow lags with respect to current representing real power consumed. Generally to counteract the reactive power lag a starting and/or running capacitor or condenser means is provided to have a leading current therethrough which offsets the lagging current and thereby increases the real power consumed closer to unity power factor which is desirable economically. However, such added appliance components occasionally require servicing and access thereto is limited so far as space is concerned in most appliance cabinets.

In FIGURE 1 there is shown an outline of a cabinet generally indicated by numeral 10 or cooling or refrigerating apparatus such as a refrigerator, freezer or air conditioner having a motor-driven compressor 11 as well as an evaporator 12 and condenser 13 suitably connected by conduits or tubing through which a refrigerant such as Freon and the like can pass. Inside the cabinet 10 adjacent to a side or corner thereof there can be provided a generally U-shaped mounting bracket or plate 15 having arm or wing portions 16 and 17 integral therewith as well as suitable fastening to the cabinet as represented by rivet or bolt means 18. The bracket or plate means 15 is apertured or slotted along opposite edges as indicated by reference numeral 19 and a relay means generally indicated by numeral 20 is mounted or supported by the bracket or plate means 15 on one side thereof. The relay means 20 includes a main body or box portion 21 as well as a relay box cover portion 22 both of moldable insulating material. The relay box cover portion 22 can snap on and off the main body portion 21 and a bolt fastening means such as a U-shaped bolt 23 can fit through laterally separated holes or passages in the cover portion 22 so as to embrace and straddle the cover portion and main body portion with opposite threaded ends of the U-shaped bolt 23 fitting into the openings 19 of the plate or bracket means 15. A suitable grommet 24 of elastomeric material and the like can provide an insulating and sound-deadening support for each of the threaded ends such as 25 to which a nut 26 can be threaded. The relay means 20 is mounted adjacent to a capacitor or condenser means 27 that can be held by a U-shaped spring clip 28 mounted by nuts and bolts 29 to the arm or wing 16 of the plate means 15. The U-shaped clip 28 can have opposite arms thereof engage a projection such as P provided on cover or end-cap portions of the condenser or capacitor means 27.

FIGURES 2 and 3 provide bottom and end views of the relay box cover portion 22 provided with pre-assembled cable and terminal means fitted to passages and recesses provided in the relay box cover portion of moldable insulating material. A dual male blade terminal means generally indicated by numeral 30 is provided and adapted to fit in a pair of substantially parallel oblong recesses R and each such terminal means 30 includes a body portion 31 that extends substantially longitudinally of the recesses R. Each dual male blade terminal means 30 includes a multiple side wing crimp portion 32 engageable with insulated conductors or wires W. This crimp portion 32 is located to one side of intermediately located and laterally projecting tab portions 33 which frictionally engage and interlock with an undercut embossed portion 34 extending integrally and downwardly from the relay box cover portion 22 of moldable insulating material. Elongated slots or passages 35 can be provided substantially centrally of these embossed downwardly-projecting portions 34 and these passages are adapted to receive the bolt fastening means such as the U-shaped bolt means 23 as indicated in views of FIGURES 1 and 3. Pairs of lugs 36 to register with openings or cutouts in the body portion of the relay means 20 can be provided for snap or press-fit of the cover portion to the body portion. The terminal means 30 further includes a pair of substantially parallel male blade portions 37 integral and extending laterally to one side of an end of the body portion 31 of the terminal means 30 at a location remote from the crimp portion 32. An elongated embossed portion 38 is provided extending centrally and longitudinally of the body portion 31 in a location between the intermediately located tab portions 33 which extend at substantially 45° angles in laterally opposite directions from the body portion 31 in a location intermediate thereof. The embossed portion 38 extends from in between these tab portions 33 to a location intermediate the dual male blade portions 37 which can have thickness thereof increased by folded over flaps 39 as can be seen in views of FIGURES 2, 8 and 9.

The relay box cover portion 22 further includes a central multi-cavity downwardly-projecting connector portion 40 located intermediate the recesses R on opposite sides thereof. A plurality of insulated conductors C fit into lateral passages communicating with the cavities and each attached to a hairpin-like terminal means 41 provided with a crimp portion 42 for attachment to the conductors C. Each hairpin-like terminal means 41 includes a free end 43 engageable against an abutment 44 which projects into each cavity in the connector portion 40 so as to permit anchoring of the hairpin-like terminal means 41 on one side of a cover plate 45 attachable by a fastening or screw means 46 to the connector portion 40 so that transverse holes or passages 47 thereof are axially in alignment with an arcuate or curved end 48 of the hairpin-like terminal means 41. These hairpin-like terminal means are similar to those disclosed in a Patent 2,874,365, Woofter belonging to the assignee of the present invention. It is to be noted that the dual male blade terminal means 31 as well as the hairpin-like terminal means 41 with wires and conductors attached thereto as well as the cover plate 45 can be pre-assembled to the relay box cover portion 22 such that the entire pre-assembled component can be readily fitted on and off the body portion 21 of the relay means 20. Since the terminal means and conductors or wires attached thereto are pre-assembled with the relay box cover portion 22, it is possible for the entire pre-assembled component to be removed from the relay means 20 for servicing thereof without requiring disconnection of wiring or conductors collectively forming a cable means having ending in a location when space is limited and use of tools to remove such ending from terminal posts is difficult. The cable means including the insulated wires or conductors and terminals attached directly to ending thereof can be pre-assembled by the cable and terminal manufacturer to the relay box cover portion for shipment directly to an assembly plant for a manufacturer of refrigerating appliances. Thus, a considerable saving in time of assembly and material can be realized for the appliance manufacturer while also enhancing the serviceability of the appliance components.

In FIGURES 4 and 5 as well as in FIGURES 6 and 7 there can be seen another modification of the relay box cover portion having features identified by reference numerals provided with priming where comparable to that of the illustrations of FIGURES 2 and 3. The terminal means 30 are identical and therefore the same reference numerals are applied thereto in all of the views of FIGURES 2 through 9. The relay box portion 22' differs from the relay box portion 22 of FIGURES 2 and 3 in that in the embodiments of FIGURES 4-5 and 6-7 each relay box cover portion is combined with an integral condenser or capacitor means mounting socket portion S located immediately adjacent thereto and removable therewith. In the embodiment of FIGURES 4-5 the condenser or capacitor means 27' can have a base thereof fit complementary to substantially arcuate or cylindrically extending side walls of the socket portion S with a lower outer periphery of the capacitor or condenser means housing being provided with concentric ribs 49' to complement and snap-fit into engagement with corresponding ribs 49 provided integrally with the inner surfacing of the arcuate wall or cylindrically extending socket portion S. The socket portion S can include a pair of integral and hollow sleeve-like portions 50 which extend into space inside the socket portion S and which are adapted to receive female terminal means 51 that can be fitted directly to the portions 50 or which can be held in insulating housings press-fitted to the hollow interiors of the portions 50. These female terminal means and optional housings therefor can be in accordance with such terminal structure shown by a Patent 2,682,038, Johnson belonging to the assignee of the present invention.

In the embodiment of FIGURES 6 and 7 the socket portion S integral with the relay box cover portion 22' is further provided with a semi-arcuate extension E having laterally outwardly extending abutments A located substantially diametrically opposite each other and engageable by hook ends 60 of a resilient latchable clamp or clip means 61 to embrace and hold the condenser or capacitor means 27' in place in the integral mounting socket portion S. Suitable lead wires L as indicated in views of FIGURES 5 and 7 can provide energization to the female terminal means engageable by male blade connectors extending from the bottom of the condenser or capacitor means. In both of the embodiments of FIGURES 4-5 and 6-7 it is to be noted that the combined relay box cover portion as well as the integral capacitor socket portion can be removed as a unit from a relay means having a body portion similar to that illustrated in FIGURE 1. The relay means body portion can also be provided with female terminal means similar to those of the aforementioned patent and interconnection between a pair of such terminal means can be established by use of the dual male blade portions 37 of the terminal means 30 fitted and mounted to the relay box cover portion as described herein.

While the embodiments of the present invention as herein disclosed constitute preferred forms, it is to be understood that other forms might be adopted.

What is claimed is as follows:

1. For use to improve serviceability of an appliance housing components thereof as well as a relay means with a box-like body portion in a limited environmental space, a relay box cover portion comprising, a body of moldable insulating material having a pair of substantially parallel recesses on opposite sides of a central connector terminal portion, embossed portions having passages therethrough for receipt of fastening means and extending into the recesses, and a dual male blade terminal means including an elongated metal body portion having a conductor crimp portion integral therewith as well as intermediately located laterally extending tab portions to fit into engagement with said central connector portion and embossed portions.

2. In an appliance cabinet having capacitor-relay means operable therewith in a combined mounting per se to fit in limited space, comprising, a mounting plate and relay means having a box-like body portion mounted thereon, a relay box cover portion of moldable insulating material having a pair of substantially parallel recesses located on either side of a central connector terminal portion, apertured enlargements integral with said cover portion and extending into the recesses, fastening means to fit complementary to said apertured enlargements and thereby to hold the relay means on said mounting plate, mounting means to hold the capacitor immediately adjacent to the relay means, and dual male blade terminal means including an elongated metal body portion having a conductor crimp portion on one end thereof opposite to an end provided with a substantially parallel pair of integral male blade portions as well as intermediately located laterally extending tab portions to engage and establish positioning of said terminal means between said central connector terminal portion and said enlargements.

3. The combined mounting of claim 2 wherein said fastening means is a U-shaped bolt that straddles and embraces said relay box cover portion held therewith on one side of the relay means resiliently on said mounting plate.

4. The combined mounting of claim 2 wherein there are lug-like extensions integral on opposite sides of said enlargement to snap-fit into engagement with the relay means box-like body portion.

5. In a cabinet for cooling apparatus such as a refrigerator, freezer, air conditioner and the like having a compressor relay means where access space is limited, a combined structural component including a relay box cover portion and capacitor mounting socket portion integral with each other of moldable insulating material, said cover portion including a pair of substantially parallel recesses located on either side of a central connector terminal portion, male blade terminal means carried directly on cable ending and pre-assembled therewith on said cover portion, and fastening means to hold said combined cover and socket portions in place on the compressor relay means, said socket portion including a curved wall to receive the capacitor to permit placement and removal thereof as a unit with said cover portion.

6. The combined structural component of claim 5 wherein the capacitor has a housing of insulating material provided with ribs along a peripheral edge thereof to complement ribbing along an inner periphery of the curved wall of said socket portion adapted to receive terminal means for energization of the capacitor.

7. The combined structural component of claim 5 wherein there is a semi-arcuate extension of the curved wall of said socket portion, a pair of substantially diametrically opposite outwardly projecting abutments along edges of said extension, and a spring-like clamp means with opposite hooked ends to engage said abutments thereby to hold the capacitor to said socket portion and combined relay box cover portion.

8. The combined structural component of claim 5 wherein said male blade terminal means includes an elongated body portion having cable conductor ending crimped therefor for pre-assembly to said cover portion, a pair of angularly extending portions being provided centrally along said terminal means to engage said cover portion, and dual male blade portions substantially parallel to each other and integral with an end of said terminal means.

9. In a preassembled appliance component for compact arrangement and ready accessibility to a relay box and condenser means as well as wiring harness connections, the improvement which comprises, a body of moldable insulating material with predetermined embossments and integrally including both a relay cover portion as well as a condenser mounting portion, a male blade terminal means secured directly to said body as wiring harness connections for the relay and condenser means, and a fastening means complementary to said embossments yet removable for disassembly of said relay cover portion, terminal means and condenser mounting portion as a unitary component.

References Cited by the Examiner
UNITED STATES PATENTS

| | | | |
|---|---|---|---|
| 2,793,354 | 5/57 | Heimbach | 339—258 |
| 2,891,389 | 6/59 | Tull | 62—298 |
| 2,974,302 | 3/61 | Ellis | 339—288 |
| 3,021,053 | 2/62 | Hopkins et al. | 339—277 |

JOHN F. BURNS, *Primary Examiner.*

WILLIAM J. WYE, *Examiner.*